May 30, 1933.　　A. M. ALGEO ET AL　　1,911,870
GLASS FORMING MACHINE
Filed Nov. 29, 1926　　7 Sheets-Sheet 1

Inventors
Albert M. Algeo
George R. Haub
By Eccleston & Eccleston
Attorneys

May 30, 1933.  A. M. ALGEO ET AL  1,911,870
GLASS FORMING MACHINE
Filed Nov. 29, 1926  7 Sheets-Sheet 2

Inventors
Albert M. Algeo
George R. Haub
Eccleston + Eccleston
Attorneys

May 30, 1933.  A. M. ALGEO ET AL  1,911,870
GLASS FORMING MACHINE
Filed Nov. 29, 1926   7 Sheets-Sheet 4

Inventors
Albert M. Algeo
George R. Haub
By Eccleston & Eccleston
Attorneys

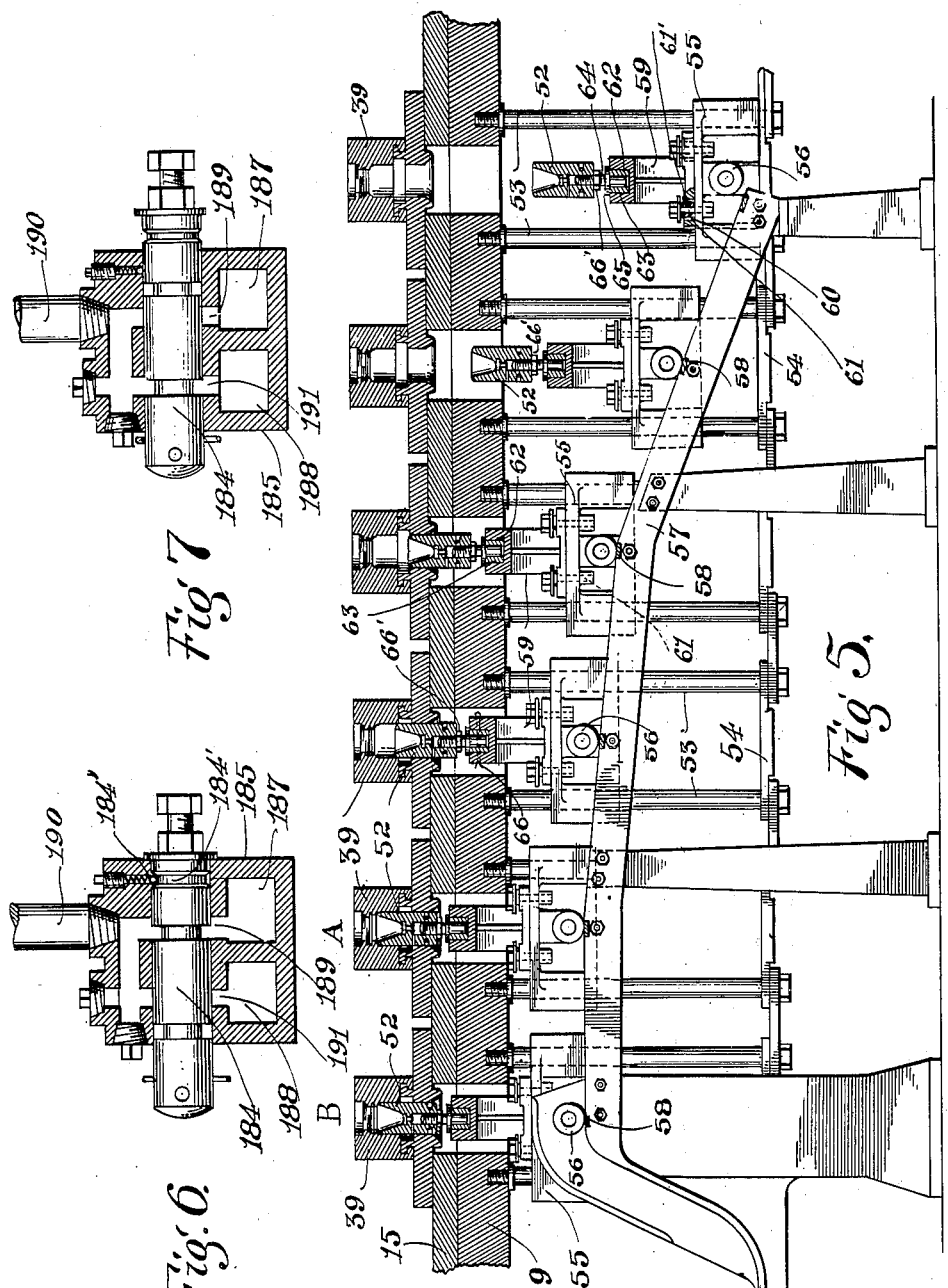

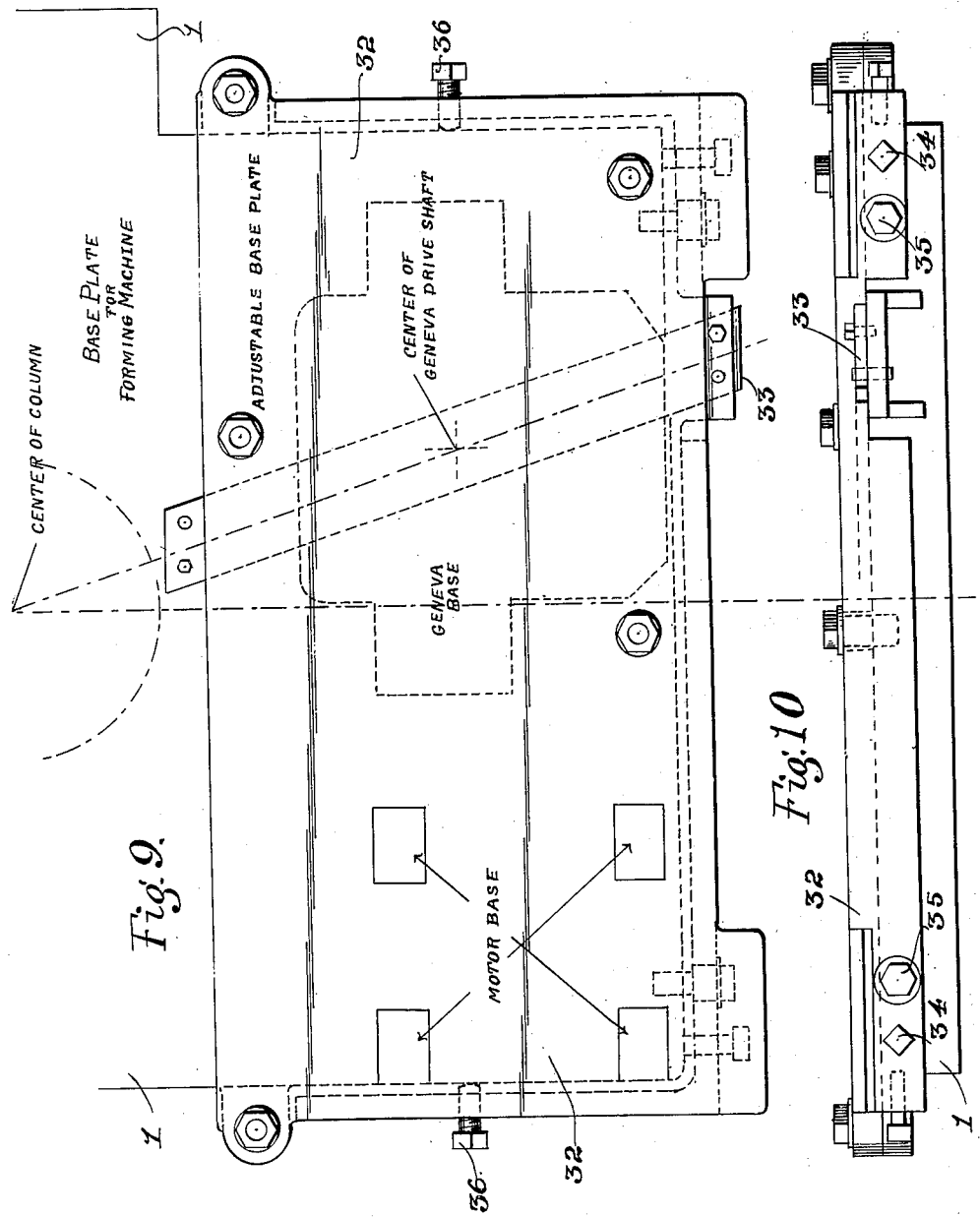

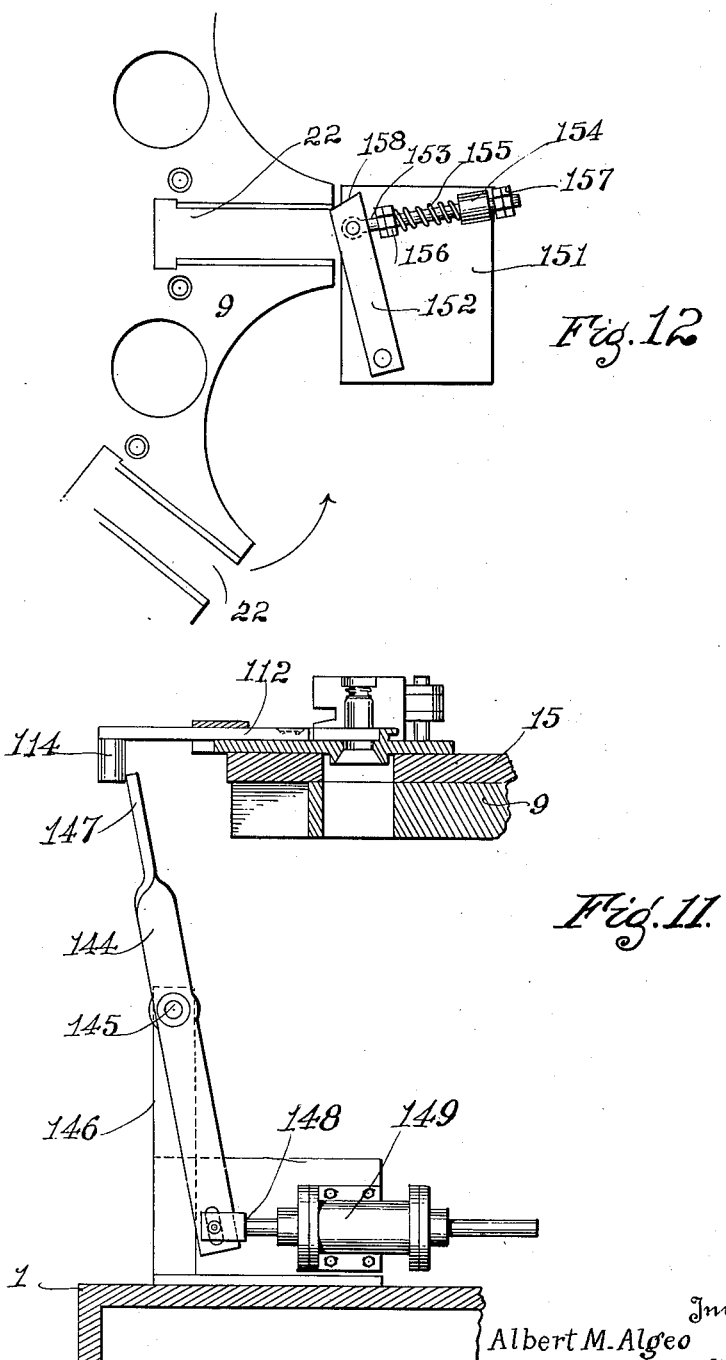

Patented May 30, 1933

1,911,870

UNITED STATES PATENT OFFICE

ALBERT M. ALGEO AND GEORGE R. HAUB, OF WASHINGTON, PENNSYLVANIA, ASSIGNORS TO HAZEL-ATLAS GLASS CO., OF WHEELING, WEST VIRGINIA, A CORPORATION OF WEST VIRGINIA

GLASS FORMING MACHINE

Application filed November 29, 1926. Serial No. 151,514.

The invention relates to an entirely automatic machine for the manufacture of either pressed or blown glassware, and it involves many novel features which will be apparent, to those skilled in the art, from the following detailed description when taken in connection with the accompanying drawings; in which Figure 1 is a vertical sectional view taken through the pressing station; the upper portion of the machine, including the pressing mechanism, being broken away.

Figs. 1 and 2 are to be combined to show the complete mechanism at the pressing station.

Figure 5 is a developed straight line elevational view of the inclined tract for raising and lowering the blank molds.

Figure 6 is a vertical sectional view of one of the valve mechanisms for controlling one of the operating cylinders.

Figure 7 is a view similar to Figure 6, but showing the valve in a different position.

Figure 8 is a detail sectional view of the lock mechanism cooperating with a slot of the Geneva wheel. The cylinder for operating this lock is controlled by the valve mechanism shown in Fig. 2; which valve mechanism is controlled by the position of the pressing plunger.

Figure 9 is a plan view of the structure provided for adjusting the Geneva mechanism toward the center of rotation of the forming machine.

Figure 10 is a front elevational view of the structure shown in Figure 9.

Figure 11 is an elevational view of the construction for withdrawing the mold bottom; a portion of the mold table being shown in section; and, Figure 12 is a plan view of a spring latch cooperating with the Geneva wheel to prevent back-lash.

Figure 1:
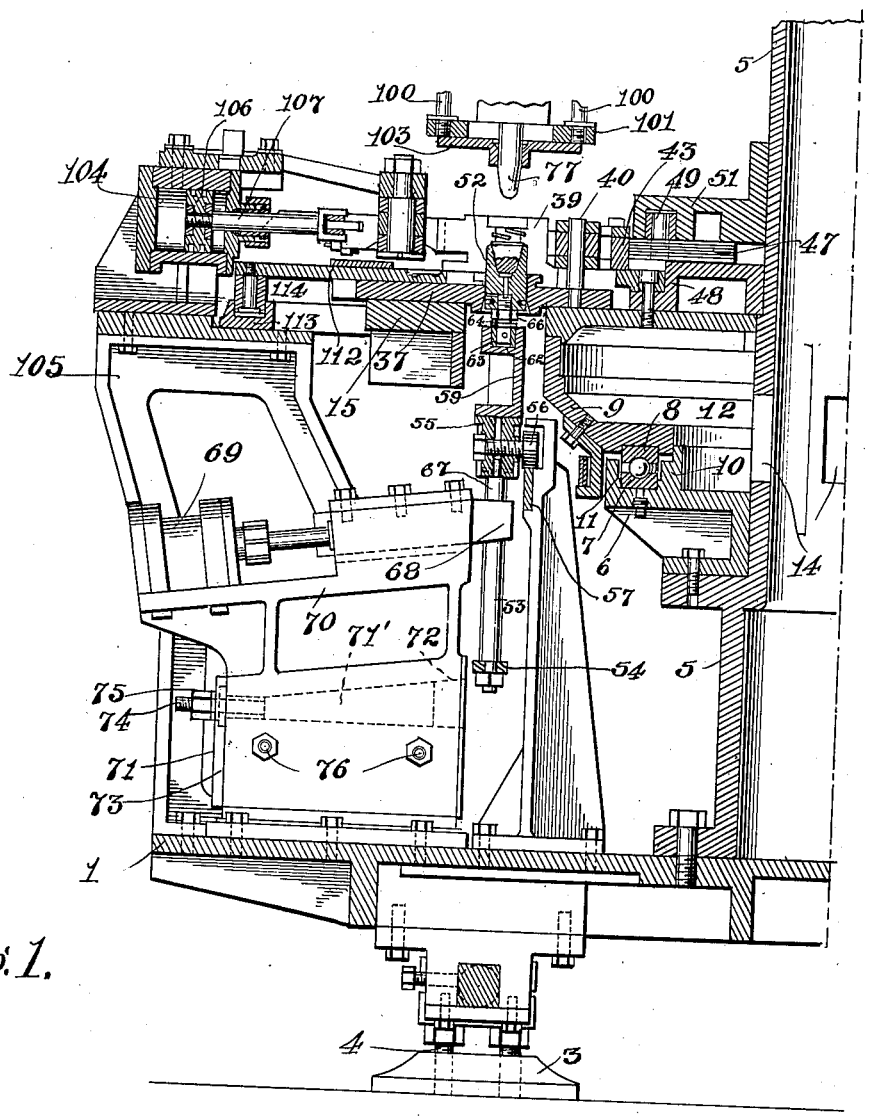

Referring to the drawings more in detail, numeral 1 indicates the base plate upon which the machine, as a whole, is mounted; the usual base plate being preferably provided with the usual axles and wheels 2 for facilitating the movement of the forming machine to or from position relative to a glass tank. However, after the machine has been properly positioned relative to a tank, it is desirable that it be fixed against movement or vibration due to the operation of the mold table and associated parts. For this purpose we have provided shoes 3 which are arranged under the axle, and which are provided with leveling screws 4. After the machine is moved to its desired position it rests upon these shoes, which provide a firm foundation preventing undue vibration, and which also provide means for accurately leveling the machine.

The base plate 1 has bolted, or otherwise secured thereon, a central column 5, carrying a ball bearing support 6. A ball race 7 is mounted in the support 6, and a cooperating ball race 8 is carried by a revolving member 9 which is the Geneva wheel. Upwardly extending flanges 10 and 11 are formed integral with the bearing support 6, and provide for the retention of the lubricant in which the ball bearings are submerged, and also provide sealing means for the air chamber 12. Air is supplied by a pipe 13 (Fig. 2) which is connected to the top of the column 5; the air being conducted through the column and then through openings 14 to the air chamber 12, for cooling purposes.

Figure 4:
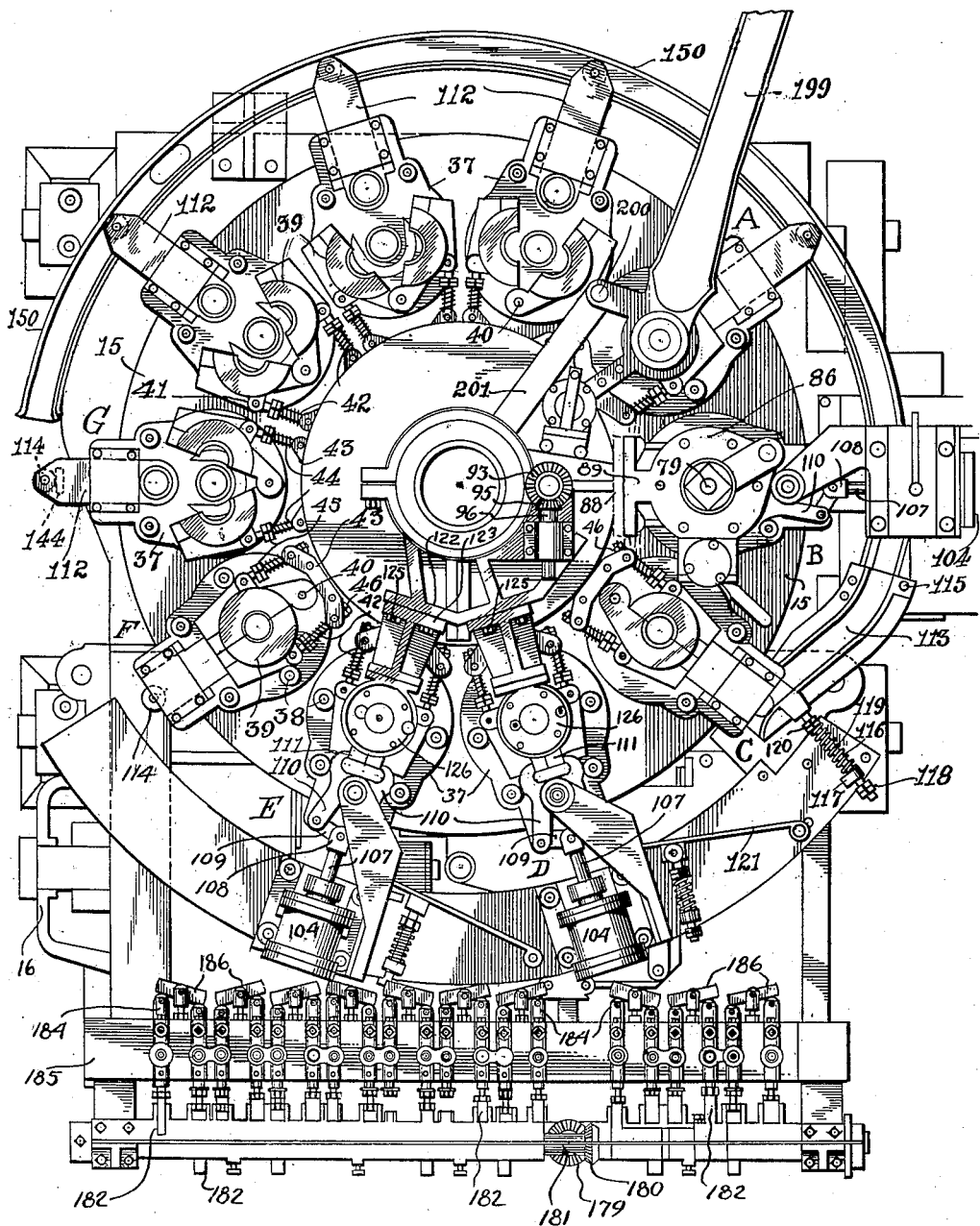
Figure 4 is a plan view of the machine; parts being omitted for the sake of clearness.

The revolving member 9, or Geneva wheel, is bolted or otherwise attached to the mold table 15, which is revolvable on the column 5, and which is preferably driven by a motor 16 (Fig. 4); it being apparent, of course, that other driving means may be employed. The motor is operatively connected to a Geneva mechanism, by means of which the mold table is intermittently rotated. The driving mechanism, the Geneva mechanism, and the means for radially adjusting the Geneva mechanism, will not be described.

The motor 16 is suitably geared or connected to the worm shaft 17 which is in mesh with the worm wheel 18 loosely mounted on the vertical shaft 19 which has keyed thereto the Geneva driving wheel 20. This driving wheel is of the usual type and comprises a roller 21 which engages slots 22 (Fig. 12) in the Geneva wheel 9 to impart intermittent movement to the mold table 15; and of course, the usual circular part 21' which engages a complementary recess in the member 9, to lock the mold table at the various stations during the forming operation.

The shaft 19 which carries the Geneva driving wheel 20, is preferably provided with a safety friction drive, which consists of friction blocks 23 which are inserted in the friction wheel 24 keyed to the shaft 19. The blocks 23 are in frictional contact with the upper surface of the worm wheel 18 and the under surface of the friction disc 25 which is adjustably connected to the worm wheel 18 by means of stud bolts and nuts 26. It is thus seen that the worm wheel and friction disc are free to turn on the shaft 19 when the friction is overcome by reason of some accidental obstruction to the movement of the mold table, whereby provision is made against injury to the parts, as might occur with an inflexible or positive driving means.

The worm wheel 18 and worm shaft 17 are suitably inclosed for the purpose of retaining oil and excluding foreign matter, by a gear casing 27, which casing is also adapted to carry the ball bearings 28 and 29, supporting the lower end of the shaft 19. A bracket 30 is attached to the base of the gear casing and adjacent its upper end is provided with ball bearings 31, which together with the lower bearings maintain the shaft 19 in true vertical position.

The operation of the Geneva drive is well understood. When the roller 21 enters one of the slots 22 of the Geneva wheel the mold table is caused to rotate one step, and as the roller passes out of the slot the circular part 21' enters a complementary recess in the Geneva wheel and locks the mold table against further movement; so that each complete rotation of the drive shaft 19 causes the mold table to be advanced one step. Of course the Geneva wheel is provided with a number of slots equal to the number of molds carried by the table; a ten mold table being illustrated in the present instance, though this number may be increased or decreased as desired.

In forming machines employing the Geneva drive the cooperating parts between the Geneva wheel and the Geneva drive become worn after continued use, and this results in considerable lost motion whereby the mold table is not firmly secured during the forming operations, the molds are not accurately positioned with respect to their cooperating forming means, etc. We have devised a simple and efficient construction to overcome these objectionable features which construction will now be described; reference being had particularly to Figures 9 and 10.

The base plate for the forming machine is indicated by numeral 1, and adjustably mounted on this machine base plate is an adjustable base plate 32 on which is mounted the motor 16, the Geneva drive unit, and the valve unit. The lower side of the adjustable base plate is provided with a keyway which receives the key 33, and this keyway and key extend radially of the center of the column 5 about which the forming machine rotates. By means of screws 34 and 35 the adjustable base plate may be moved in or out to the desired extent, while the screws 36 assist in maintaining the adjustable base plate in its adjusted position.

When the Geneva mechanism has become worn, or for any other reason may need adjustment, it is only necessary to operate the appropriate screws, thereby moving the base plate 32, carrying the motor, the Geneva unit and the valve unit, and bringing the Geneva drive mechanism into proper cooperative position with respect to the Geneva wheel 9 attached to the mold table. The keyway and key 33 cause the plate, and all the mechanism carried thereby, to be moved in a direction radial to the center of the column 5. It is evident that to properly adjust the Geneva unit the movement must be radial to the center of the column carrying the forming machine, but without this keyway and key construction, or its equivalent, it would necessarily involve considerable time and effort to move the Geneva mechanism accurately in a radial direction; but with the use of the keyway and key it is impossible to adjust the Geneva mechanism in any direction except radially of the center of the column 5 about which the mold table rotates.

The mechanism for operating the blow molds will now be described.

A plurality of blow mold plates 37 are mounted on the mold table and suitably attached thereto by bolts 38; the bolt holes in the plates being slightly larger than the bolts to permit the necessary adjustment. The blow molds 39 are of the partible type, and the two halves of the molds are hingedly connected and removably attached to the mold plate by means of hinge pins 40. The blow molds are adapted to be opened and closed at the desired positions, in the cycle of operation; and the mechanism for accomplishing the opening and closing of the blow molds will now be described.

Each of the mold sections or halves, is provided with a lug 41 and pivotally connected to each lug is a link 42; the opposite ends of the links being slidably and pivotally connected to a cross member 43. Compression springs 44 embrace the links 42 and extend between the lugs 41 and the cross member 43; tension adjusting nuts 45 and retaining nuts 46 also being provided. This cross member 43 is mounted on the end of a slide 47, and the slide is carried by the slide guide ring 48 which is bolted to the mold table. Each of the slides is provided with a roller 49 which is engaged in a cam track 50 of a stationary cam 51. It is apparent that as the table rotates the slides 47 will be moved inwardly and outwardly at the desired time, by reason of the rollers 49 engaging the cam track 50. When a slide moves inwardly the link connections between the cross member 43 and the lugs 41 will cause the mold to be opened; and upon outward movement of the slide the mold will be closed. The springs 44 provide a safety feature in that they prevent the breakage or straining of moving parts in the event that some obstruction should prevent the complete closing of a blow mold. Under such circumstances this resilient connection will permit the moving parts to continue their normal outward movement, while a positive connection would necessarily result in the breakage or straining of the moving parts, if, for some reason, it should be impossible to completely close a mold.

Arranged below and in vertical alignment with the blow molds 39 are the blank molds 52 which are adapted to telescope within the blow molds, as illustrated in Figures 1 and 5. There is, of course, a blank mold for each blow mold, and each blank mold is mounted for vertical sliding movement on a pair of guide rods 53 which are bolted or otherwise secured to the Geneva wheel 9; the slide rods being held in parallel relation by means of a cross bar 54 attached to the lower ends of the rods. A slidable bracket 55, which carries the blank mold, is mounted on the guide rods 53, and this bracket is provided at one side with a roller 56 adapted to ride on a cam track 57 which is shown in a developed view in Figure 5. The cam track has a gradual incline for a portion of its length to gradually raise the blank mold into position for receiving the charge; the cam track being horizontal between the glass receiving station and the pressing station. Just beyond the pressing station the cam track has a sharp decline, whereby the blank mold is quickly lowered from its telescoping position in the blow mold and descends below the level of the mold table to a position where the bracket 55 rests on the cross bar 54, where it remains until the beginning of the next cycle of operations when the roller 56 again comes into contact with the gradually inclined portion of the cam track which causes the blank mold to again assume its telescoping position in the blow mold. Hardened steel inserts 58 are provided in the cam track at each station to minimize the wear on the track.

The sliding bracket 55 has mounted on its upper side an auxiliary member 59 which carries the blank mold. It is essential, of course, that the blank mold be accurately centered with respect to the blow mold, and if the blank mold were rigidly carried by the bracket it is apparent that the slightest lateral movement of either the blow mold or the blank mold would destroy the alignment, so that the blank mold would not enter the blow mold. In order that a proper fit between the blank mold and the blow mold may be assured at all times, we have provided a floating connection between the auxiliary member 59 and the sliding bracket 55. Obviously the floating connection may be of various forms, and the invention is therefore not limited to any particular construction, but in accordance with our preferred construction, as illustrated in Figure 5, the base of the auxiliary member 59 is provided with two holes 60 adapted to receive bolts 61 which are screwed into the sliding bracket or crosshead 55. A bushing 61' surrounds each of the bolts, and it will be noted that the bushings extend slightly above the upper surface of the base of the auxiliary member. By this construction, when the bolts are secured in place, the bolt head, or washer if employed will engage the upper end of the bushing, so that the freedom of movement of the auxiliary member is not interfered with. It will also be noted that the diameter of the bushing is slightly less than the diameter of the hole, so that the auxiliary member 59 is free to move a limited extent in any direction, and yet is securely anchored to the crosshead 55. By means of this simple construction all concern about securing the necessary fit between the blow mold and blank mold disappears, for the blank mold has a freedom of motion laterally, and as it ascends it will merely be guided into the blow mold, moving laterally as may be necessary to properly align itself automatically with the blow mold.

A socket 62 is provided on the upper side of the auxiliary member 59, and in this socket is a hardened steel bushing 63. This constitutes a bearing for a stud bolt 64 having a supporting flange 65; the stud bolt being detachably connected to the auxiliary member by means of a cotter pin 66. The upper part of the bolt 64 is threaded and screwed into the bottom of the blank mold 52; a lock nut 66' being provided to secure the parts in place. This provides means for final adjustment between the upper rim of the blank mold and the shoulder in the interior of the blow mold, and this also takes care of any fine adjustments which are necessary as the molds become worn by abrasion during the repolishing process.

Before the pressing operation occurs, it is necessary to relieve the roller 56 and cam track 57 of the strain resulting from the pressure applied during the pressing operation. Therefore before describing the pressing operation we shall describe the mechanism for taking care of the strain during the pressing operation.

A hardened steel pin 67 projects downwardly from the sliding bracket 55, and a wedge 68 is adapted to be thrust under this pin when a blank mold reaches the pressing station, whereby the pressure exerted during the pressing operation will be transferred from the roller and cam to this wedge member 68. It is apparent that the wedge member will also cause a slight upward movement of the blank mold, thereby assuring a tight fit between the blank mold and blow mold during the pressing operation. The wedge member 68 is moved back and forth, at the desired intervals, by means of a cylinder 69; the admission and exhaust of air pressure to the cylinder being controlled by a valve mechanism to be described hereinafter.

The wedge member 68 and its operating cylinder 69 are supported upon a bracket 70, and this bracket is vertically adjustable to take care of the wear of associated parts. This adjustment might be accomplished by various means, but the particular means illustrated herein and which has been found to be very satisfactory in practice, consists of a block 71 having a horizontal upper surface, upon which rests a slidable wedge 71′ having a horizontal lower surface and an inclined upper surface, and resting on this inclined upper surface of the wedge is the inclined bottom 72 of the bracket 70. A skirt 73 extends downwardly from the bracket on both sides of the sliding wedge and block, thereby forming a guide and guard for those elements. The sliding wedge 71′ is moved by means of a threaded rod 74 and nut 75, and locked in adjusted position by means of bolts 76. It is obvious that by the above described means a very fine adjustment may be made with ease and rapidity.

The operation of the mechanism thus far described, is as follows:

The Geneva drive wheel gives the rotary mold table a step-by-step motion, and as the feeding station is approached the blow mold is closed by the cam track 50, and the blank mold is moved upwardly into telescoping relation with the blow mold; so that when the Geneva mechanism locks the table the mold unit at the feeding station A is in position to receive its charge through the neck of the blow mold. The charge of glass may be fed to the mold by any of the well known feeders, or in any desired manner; but as the feeder forms no part of the present invention it is deemed unnecessary to illustrate any feeding means.

The mold having been charged, the table is now rotated by the Geneva drive to bring the mold unit to the pressing station B. By suitable timing mechanism, to be hereinafter described, pressure is now admitted to the outer end of cylinder 69, whereupon the wedge member 68 is projected forwardly to its position engaging the pin 67, so that the wedge member will cause a slight upward movement of the blank mold thereby assuring a tight fit between the blow mold and blank mold, and will also receive the pressure exerted during the pressing operation. The pressing mechanism, by which the charge in the blank mold is pressed upwardly into the neck of the blow mold, thereby forming the parison, will now be described; reference being had particularly to Figure 2.

The pressing mechanism consists of a plunger 77 which is removably attached to a plate 78 threaded on the lower end of a rod 79 which extends upwardly through and beyond the hollow piston rod 80. The rod 79 has a flanged collar 81 securely attached thereto above the end of the hollow piston rod, and the hollow piston rod has a collar 82 threaded on its upper end and maintained in adjusted position by means of a lock nut 83. A spring case 84 is threaded onto the collar 82 and it has an opening in its upper end through which passes the upper end of the rod 79. A compression spring 85 extends between the flanged collar 81 on the rod 79 and the upper end of the spring case attached to the hollow piston rod 80.

The means above described provides a flexible connection between the piston rod and the pressing plunger rod, thereby safeguarding against crushing or straining the glass by undue pressure; for it is apparent that if the fluid pressure in the cylinder should become too great it will overcome the pressure of the spring 85, whereupon the hollow piston rod will continue its downward movement while the pressing plunger rod will remain stationary.

For the purpose of reciprocating the hollow piston rod 80 we provide a cylinder 86, in which is arranged a piston 87 attached to the hollow piston rod. The means for controlling the fluid pressure for reciprocating the piston and thereby raising and lowering the pressing plunger, will be described hereinafter.

A bracket 88 is keyed on the column 5 for vertical movement, and attached to this bracket is a plate 89 which carries the plunger operating cylinder 86. The plate 89 is preferably attached to the bracket 88 by means of bolts 90, and the bolt holes are slightly larger than the bolts, so that the operating cylinder, the plunger rod and all the associated elements may, as a unit, be given a fine adjustment for leveling the pressing mechanism.

To adjust the pressing mechanism vertically we provide a rod 91 which is attached at its lower end to the bracket 88; the upper portion of the rod passing freely through a collar 92 which is fixed to the column 5. The upper portion of the rod 91 is threaded, and mounted thereon is a bevel gear 93; the bevel gear being held against vertical movement by means of a flanged retaining member 94 attached to the collar 92. A bevel gear 95, carried by a shaft 96, meshes with the bevel 93; the shaft 96 extending to any position convenient to the operator. It is apparent that by the rotation of the shaft 96 in one direction or the other, the bevel gear 93 will be rotated in a direction to raise or lower the threaded rod 91 which is attached at its lower end to the vertically slidable bracket 88 which carries the presser operating cylinder 86, whereby the entire pressing mechanism will be raised or lowered to the desired extent. After proper adjustment the bracket 88 is fixed in position by clamping it to column 5 by means of clamping screws 88'; the bracket being split and flanged at this point to permit clamping movement.

An upper spring plate 97 is mounted for adjustment on the lower end of the hollow piston rod 80 by means of nuts 98, 99; and slidable through holes in this plate are spring rods 100, which are attached at their lower ends to the lower spring plate 101. Springs 102 are mounted on the rods 100, and are retained in position between the upper and lower spring plates, so that they normally retain the lower spring plate in its lowermost position. The lower spring plate carries the neck ring plate 103, and the lower end of the pressing plunger 77 passes through an opening in the neck ring plate and projects slightly beyond it when the pressing mechanism is in its normal or inoperative position. When the piston rod is caused to descend the neck ring plate is caused to seat on the blow mold and is held under pressure in its cooperative position with the blow mold by means of the springs 102. As the piston rod continues to descend the pressing plunger 77 passes downwardly into the blank mold and forces the glass upwardly into the neck mold and against the neck ring, thereby forming the parison; any undue pressure on the glass being prevented by means of the resilient connection between the plunger rod and the hollow piston rod, hereinbefore described.

During the pressing operation it is necessary that the two halves of the blow mold be held tightly closed to prevent the pressure on the glass forcing them apart. Accordingly we have provided at the pressing station a locking mechanism, which will now be described.

A cylinder 104 is provided for the purpose of operating the mold locking mechanism, and this cylinder is preferably mounted on a bracket 105 supported by the base plate 1. A piston 106 and piston rod 107 are caused to reciprocate in the usual manner by the alternate admission of fluid pressure to each end of the cylinder; the fluid pressure being controlled by suitable valves operated by a series of cams mounted on a constantly rotating shaft, all of which will be described hereinafter. Mounted on the end of the piston rod 107 is a fork 108 having connecting links 109 pivotally connected thereto. The opposite ends of the connecting links are pivotally connected to hinged clamping jaws 110; the arrangement being such that when the piston rod is moved inwardly toward the center of the table the clamping jaws will be closed to firmly grip lugs 111 on the blow mold, while upon movement of the piston rod in the opposite direction the clamping jaws will be opened to release the lugs 111.

After the blow mold has been locked and the wedge block has been thrust into position under the blank mold to take the strain of the pressing operation, air is automatically admitted to the upper end of the cylinder 86 above the piston 87, thereby causing the pressing plunger to descend and enter the blow mold and blank mold to form the parison in the manner described. Air is now admitted to the opposite end of the cylinder 86 to retract the pressing plunger, and this is followed by the admission of air to the inner end of the cylinder 104 to release the mold locking mechanism, and by the admission of air to the inner end of cylinder 69 to retract the wedge block 68. In the meantime the Geneva driving wheel has made a complete revolution to bring the roller 21 into one of the slots 22, thereby advancing the mold table one step and moving the particular mold being described, from station B to station C. As the table rotates to carry the blow mold from station B to station C the blank mold is retracted from its telescoping position in the blow mold by means of the sharply declined portion of the cam track 57. The blank mold having been withdrawn, the glass blank or parison is left suspended by the neck of the blow mold. As soon as the blank mold has been dropped below the mold table a mold bottom plate 112 is thrust beneath the glass parison into cooperative relation with the blow mold. This movement of the mold bottom plate 112 is accomplished during the rotation of the table by means of a stationary cam track 113 in which track rides a roller 114 carried by the mold bottom plate; the track being designed to cause the mold bottom plates to move into operative position with respect to the blow molds at the desired point in the cycle of operation. The outer guide of the cam track 113 is pivotally mounted, as indicated by numeral 115. A pin 116 has one end pivotally attached to the free end of the guide track and the other end of the pin passes through a lug 117 and is provided with nuts 118 adjacent its extremity; the nuts acting as a stop member to prevent the pivoted guide from moving inwardly too far. A coil spring 119 is mounted on the pin 116, between the lug 117 and the tension adjusting nuts 120, thereby providing resilient pressure means to hold the mold bottom plate in its cooperative position with the blow mold when it arrives at station C.

From the foregoing description it is apparent that when the mold reaches station C the parison has been formed, the parison mold has been withdrawn leaving the parison in the blow mold suspended by its neck, and the mold bottom plate has been moved under the glass parison into its operative position with the blow mold, so that the mechanism is ready for the blowing operation. The blowing of the parison could be performed at this station C if desired, but the operation of the machine is very rapid and therefore the present practice is to not perform any operation on the parison at this station, thus affording an opportunity for the parison or blank to reach a more uniform temperature throughout, as the pressing operation at the previous station has a tendency to surface chill the parison where it has come into contact with the pressing plunger or blank mold. After this interval of rest the Geneva wheel again operates to rotate the table one step, thereby bringing the mold to the next station, which is the blowing station, as indicated by letter D on Figure 4.

At station D the mold halves are locked together by a locking mechanism similar to that employed at the pressing station, and a flat spring 121 is employed to maintain the mold bottom plate in position. The parison is ready to be blown, and the blowing mechanism will now be described.

Numeral 122 indicates a supporting member which is fixed to the column 5 of the machine, and keyed to this supporting member for vertical adjusting movement is a bracket 123; a slot 124 and bolt 125 providing means for making the vertical adjustment. Attached to the bracket 123, in a manner to be hereinafter described, is a cylinder 126 having ports 127 and 128 for the alternate admission of fluid pressure above or below a piston 129 to raise or lower the piston rod 130, to the lower end of which is attached the rigid member 131 of the blow head. An inlet pipe 132 admits air into the chamber 133, but this air is prevented from escaping when the blowhead is in raised position by means of a check valve 134. To the lower end of the valve stem is attached the movable member 135 of the blowhead, having holes 136 therethrough for the passage of air to the blow mold when the blowhead is in lowered position. The two members, 131 and 135, of the blowhead have cooperating curved, surfaces 137 which are pressed tightly together during the blowing operation to prevent the escape of air, and which also provide a swivel mounting for the movable member 135 of the blowhead, whereby the latter is freely movable in all directions, thereby assuring a proper seating of the blowhead on the blow mold. In operation, the movable member 135 of the blowhead drops of its own weight, when the blowhead is elevated, thereby causing the check valve 134 to seat and preventing the escape of air. When the blowhead is lowered the movable member 135 comes into contact with the blow mold, and the rigid member 131 continues its downward movement bringing the two curved surfaces 137 into cooperative relation to prevent the escape of air to the atmosphere, and at the same time unseating the valve 134 whereby the compressed air in the chamber 133 passes through the holes 136 into the blow mold to blow the parison to final form. The admission of fluid pressure to the cylinder 126 for raising and lowering the blowhead at the proper time, is controlled by valves operated by a cam shaft, to be described hereinafter.

It is apparent that if for some reason the blowhead did not rise at the proper time, or if the air pressure should go off the lower end of the cylinder permitting the blowhead to drop, it would be struck by a moving mold or other moving part of the machine, which might damage or destroy the blowhead or its associated elements. To avoid this possibility of breakage of parts we have mounted the cylinder 126 in such manner that it is normally held in vertical position, but so that the cylinder and the blowhead may be swung about a pivot if the blowhead is struck by a moving part. For this purpose the cylinder wall is provided with a laterally projecting flanged member 138, and the face of the bracket 123 is flanged, as indicated by numeral 139, to form a seat to receive the flanged member 138. A ring 140 is attached to the flange 139 of the bracket by means of bolts, and it projects laterally over the flange of the member 138, thereby retaining the latter member in place. By the means above described it is apparent that the cylinder 126 together with the piston rod and blowhead, is free to rotate about the bracket as a pivot. For the purpose of normally maintaining the cylinder and blowhead in vertical position, the bracket 123 is provided with a detent 141, which is normally pressed downward by a spring 142, to engage a V notch provided in the flanged member 138; the pressure of the spring being regulated by a nut 143. It is apparent that this detent will normally retain the unit in vertical position, but upon the application of any undue lateral pressure to the blowhead the V-notch will force its cooperating detent out of engagement therewith, permitting the blowhead and cylinder to swing freely about a pivot, and thereby avoiding breakage of any parts.

After the glass parison has been blown to the shape of the finished article, in the manner hereinbefore described, the blowhead is elevated, the clamping members on the mold are opened to unlock the mold, and the roller 21 of the Geneva drive wheel enters one of the slots 22 to move the table another step, bringing the particular mold being described to the second blowing station E.

At station E the blow mold is again locked by a clamping mechanism which is the same as that described as stations B and D; and a blowhead, which is operated by mechanism of the same construction as that at the first blowing station D, is caused to descend and seat upon the blow mold. The purpose of admitting air at this second station is to maintain the still semi-plastic glass in its distended form; it being understood that at this station the article becomes set or at least sufficiently cooled so that danger of collapse of the blown article thereafter, is prevented.

The next movement of the mold table brings the particular mold which has been described throughout, to station F. Here the mold remains closed, but no further blowing occurs except as it may be optional to provide for the introduction of cooling air, to further lower the temperature of the article prior to its removal at a subsequent station. We have not illustrated any means for introducing cooling air, but if it is desired we may employ a structure similar to that disclosed in the patent to Stenhouse #1,601,836, October 5, 1926; or other suitable mechanism may be employed for this purpose.

As the table rotates during its next step, to carry the mold from station F to station G, the blow mold is opened by means of the roller 49 which rides continuously in the cam track 50; the track being designed, of course, to open and close the blow molds at the desired points in the cycle of operation. Thus the blow mold arrives at station G in open condition, the finished article resting on the mold bottom plate 112, ready to be withdrawn laterally from the mold when the mold bottom plate is withdrawn. The mold bottom plate could be withdrawn by a cam during the rotation of the table, but we find in practice that better results are produced by a rather rapid withdrawal of the plate while the table is stationary. The particular mechanism we have devised for withdrawing the mold bottom plate, is illustrated in Figure 11, and will now be described.

Numeral 144 indicates a lever which is pivotally mounted at 145 on a frame 146 supported by the machine base plate 1. The upper end of the lever 144 is provided with a finger 147 which is directly behind the roller 114 carried by the mold bottom plate 112 when the mold reaches this take-out station G. The lower end of the lever 144 is attached to a piston rod 148 of a cylinder 149, which is operated by fluid pressure controlled by valve mechanism to be described hereinafter. From the above description it is apparent that when air is admitted to the cylinder to move the piston inwardly, the finger 147 will be moved outwardly, and through its engagement with the roller 114, causes the mold bottom plate to be withdrawn, thereby carrying the finished article free of the blow mold and ready to be removed to a suitable conveyor (not shown) at this or a subsequent station. The finished articles are carried from the mold bottom plate to the conveyor by a transfer mechanism, but as this mechanism forms no part of the present invention, it has not been shown herein.

During the further step-by-step rotation of the table the mold bottom plate is held in withdrawn position by means of a track 150 in which the roller 114 rides, until in the next cycle of operations the roller reaches the inturned cam track 113 which again projects the mold bottom plate into its operative position with the blow mold.

The complete cycle of operation of a single mold unit has been described above, and as all of the units are identical in construction it is apparent that all of the units will go through the same operations as described above, as each unit successively reaches the various stations.

In the intermittent or step-by-step rotation of these heavy mold tables there is often a jarring reaction or backlash, and to take care of this we have provided a very simple and efficient construction which will now be described, reference being had to Figure 12.

The Geneva wheel 9 which is attached to the mold table is provided with the slots 22 which are engaged successively by the roller 21 carried by the Geneva drive wheel; all as described hereinbefore. Mounted adjacent any convenient station is a plate 151 on which is pivotally mounted a latch 152; the free end of the latch being adapted to project into one of the open ended slots 22. A pin 153 is pivotally attached to the free end of the latch and passes through a lug 154 provided on the plate 151. A spring 155 is mounted on the pin between the lug 154 and compression regulating nuts 156; the extent of inward movement of the pin and latch being controlled by the nuts 157 mounted on the end of the pin beyond the lug. The free end of the latch is tapered or beveled, as indicated by numeral 158.

The operation of the spring latch will be apparent from the above description. The Geneva wheel 9 rotates in the direction of the arrow (Fig. 12), and just as the table is being brought to one of its intermittent stops, the spring 155 forces the free end of the latch 152 into the open ended slot, and as the end of the latch is beveled it is apparent that there will be a sort of wedging action between the edge of the slot wall and the beveled edge of the latch, whereby the latch will effectually take care of any back pressure and thus preventing any backlash or jarring reaction. When the table starts on its next step-by-step movement, the latch will simply ride over the opposite wall of the slot, and will be ready to automatically engage the next slot just as it is brought to rest by the Geneva mechanism.

In the operation of forming machines the pressing plunger may at times stick in the mold, thereby preventing its withdrawal prior to the next step-by-step movement of the mold table; or the air may go off the pressing cylinder between pressing operations, whereby the pressing plunger would drop down between a pair of molds. In either event it is apparent that the pressing mechanism would be damaged by the moving molds, unless some safety device be provided to positively prevent the rotation of the mold table when the pressing mold is in lowered position. We have provided such a safety mechanism, which will now be described, reference being had to Figures 2 and 8.

Numeral 159 indicates a cylinder which is mounted on a bracket 160 which may be located at any convenient station. The cylinder operates the usual piston rod 161, to the upper end of which is attached a locking lug 162 which is adapted to be projected upwardly into one of the slots 22 of the Geneva wheel 9 to lock the Geneva wheel, and consequently the mold table, against rotation. The piston rod and locking lug are normally pressed upward into locking position by means of a spring 163; and they are moved downward into inoperative position by the admission of fluid pressure to the upper end of the cylinder 159 by means of the pipe 164.

Figure 2:
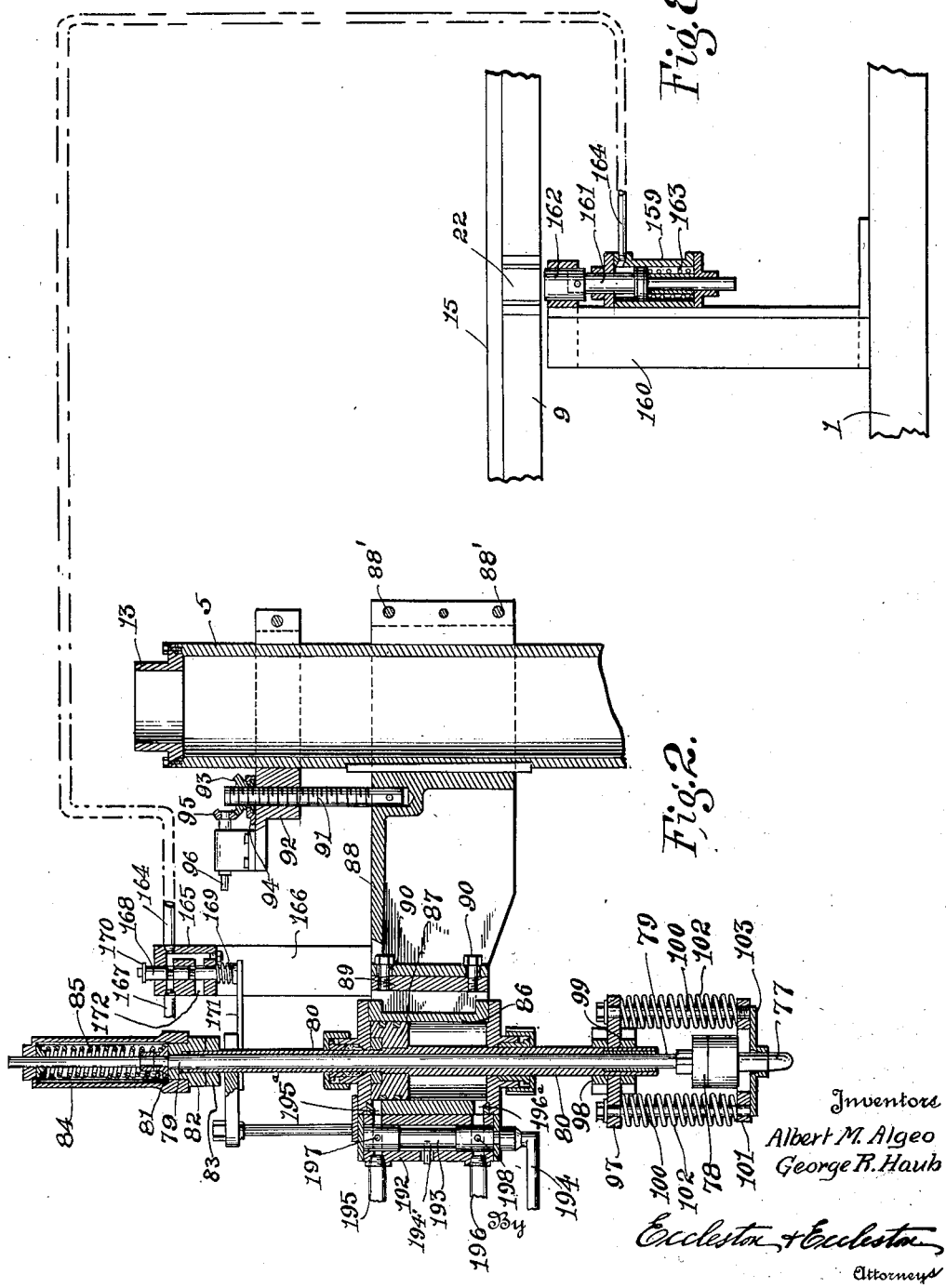
Figure 2 is a vertical sectional view taken through the pressing mechanism.
Figure 3:
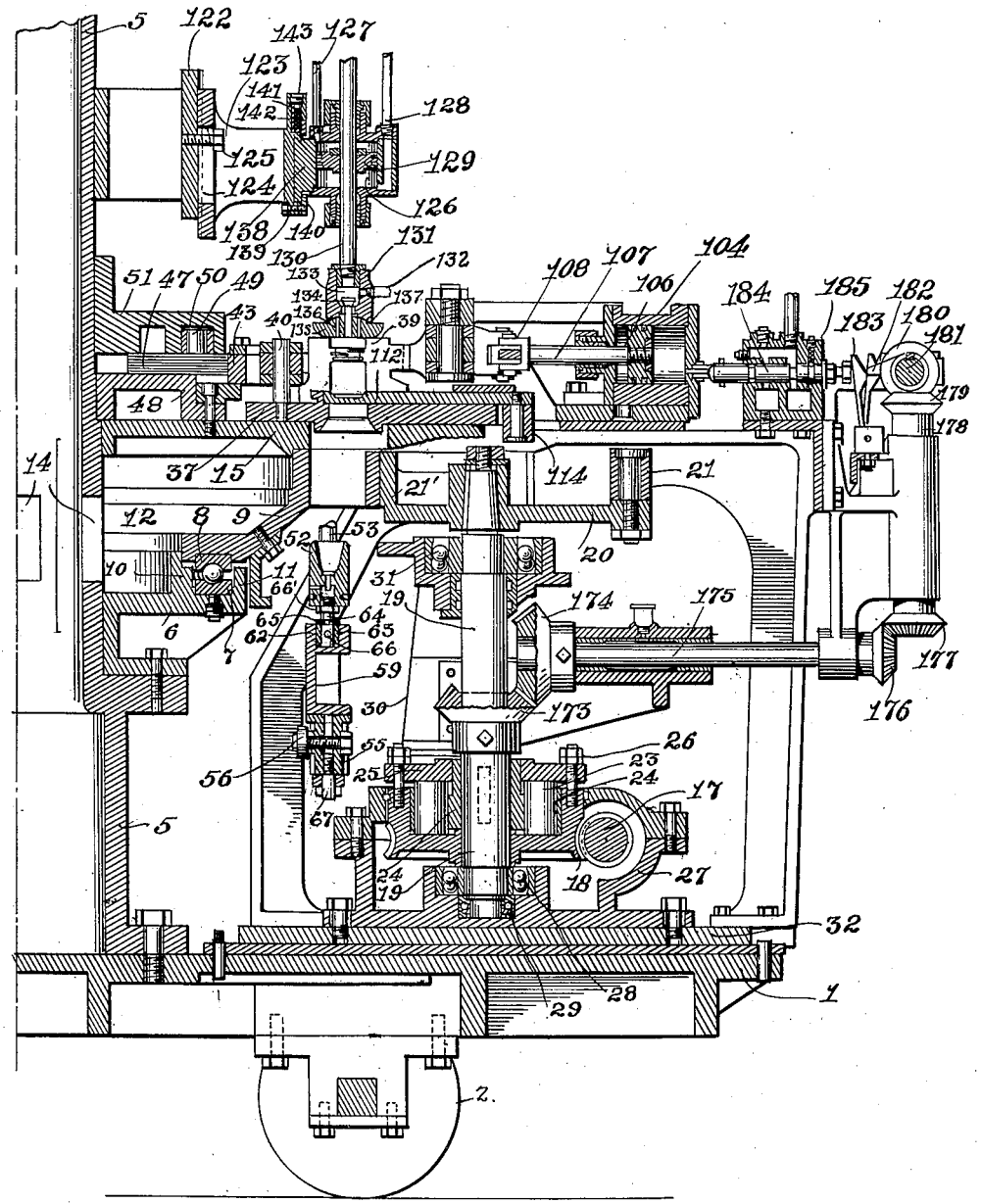
Figure 3 is a vertical sectional view taken through the blowing station.

Referring now to Figure 2, numeral 165 indicates a valve casing mounted on a bracket 166 adjacent to the pressing mechanism. A pressure supply pipe 167 enters one side of the valve casing, and the pipe 164 leads from the opposite side of the valve casing to the upper end of the lock operating cylinder 159.

Arranged for vertical sliding movement in the valve casing 165 is a valve 168, which projects through the lower end of the casing and has a spring 169 mounted thereon which normally retains the valve in its lower position; the downward movement of the valve being limited by a collar 170 mounted on the upper end of the valve which projects through and above the upper end of the valve casing. Fixed to the hollow piston rod 80 is a laterally projecting finger 171 which is, of course, raised and lowered corresponding to the movements of the pressing plunger.

The finger 171 is so positioned on the piston rod that when the piston rod and pressing plunger approach the upper limit of their travel, the finger 171 will strike the lower end of the valve 168, and as the piston rod and plunger complete their upward movement the valve will be elevated, against the pressure of the spring 169; the parts then being in the position illustrated in Figure 2. By an inspection of Figure 2 it will be apparent that the fluid pressure which is admitted to the valve casing 165 has a free passage to the pipe 164 which conveys it to the upper end of the cylinder 159, thereby lowering the piston rod 161 and locking lug 162 against the pressure of spring 163, and thus freeing the table so that it may be rotated one step by the Geneva drive.

When the piston rod 80 descends, whether to perform the pressing operation, or accidentally as by reason of the fluid pressure being shut off to the pressing cylinder, the finger 171 will release the lower end of valve 168, and this valve will be at once lowered by the pressure of spring 169. When the valve 168 moves to its lower position the passage from pipe 167 to pipe 164 is shut off, and pipe 164 is opened to exhaust through port 172. The instant pipe 164 is opened to exhaust the pressure above the piston in cylinder 159 is relieved, and the spring 163 immediately elevates the locking lug 162 to lock the table. If for any reason the pressing plunger should not be raised at the proper time, or should not be raised to the proper height, the table cannot be moved, for obviously it will remain locked until the pressing plunger is completely elevated so that the finger 171 will raise the valve 168 to admit air pressure to the upper end of cylinder 159, to thereby release the lock.

Having described the construction and operation of the machine thus far, we now revert to a description of the valve mechanism which controls the various cylinders for operating such elements as the pressing plunger, the blow heads, the mold clamps, the wedge member, the blow mold bottom, the transfer device, etc.; reference being had particularly to Figures 3, 4, 6 and 7.

Mounted upon the Geneva drive wheel shaft 19 is a mitre gear 173 meshing with a mitre gear 174 keyed to a horizontal shaft 175 which has another mitre gear 176 keyed to its outer end. This mitre gear 176 meshes with another mitre gear 177 keyed to a vertical shaft 178 which has keyed to its upper end a mitre gear 179 meshing with a mitre gear 180 keyed to a horizontal cam shaft 181. By means of the described gearing, or by any equivalent means, the cam shaft 181 is constantly rotated; it being given a complete revolution for each complete revolution of the Geneva drive wheel shaft.

Mounted on the constantly rotating cam shaft is a series of pairs of cams 182, which at the proper time successively engage pivotally mounted arms 183 which in turn engage valves 184 mounted in a long valve box or manifold 185. It will be noted that a rocking beam 186 is arranged adjacent each pair of valves 184, whereby as one valve of a pair is actuated, the other valve of that pair will be simultaneously actuated in the opposite direction.

The valve box 185 is provided with a long compressed air conduit 187, and arranged alongside this conduit is an exhaust chamber 188. For each valve there is an inlet port 189 leading from the air supply conduit 187 to a pipe 190 which leads to one end of the particular cylinder to be operated; and, of course, another pipe leads from the other valve of the same pair to the opposite end of the cylinder. For each valve there is also an exhaust port 191 leading from the pipe 190 to the exhaust chamber 188. In Figure 6 the valve is shown in position opening port 189 so that fluid pressure is supplied from the conduit 187 to pipe 190 and thence to one end of the cylinder to be operated. In Figure 7 the valve has been moved to its opposite position, so that the pipe 190 is communicating with the exhaust chamber 188. As stated hereinbefore the valves of each pair are operatively connected by the rocking beam 186, whereby they are simultaneously moved in opposite directions, so that when air pressure is being admitted to one end of a particular cylinder, the opposite end of the cylinder is communicating with the exhaust, and when one of the valves is shifted to supply pressure to the opposite end of the particular cylinder, the other valve of the pair is simultaneously moved to open to exhaust the first-mentioned end of the cylinder. We have merely described one of the pairs of valves, but it will be understood that there is a pair of valves for each cylinder to be operated, and that the valves of each pair are operated in timed sequence in accordance with the arrangement of the cams 182 on the cam shaft 181; the cams being preferably adjustable on the shaft in order that the timing arrangement may be varied to suit varying conditions. For the purpose of locking the valves 184 against accidental displacement, each valve is provided with a circular groove 184' which is so positioned on the valve that it will be engaged by a spring pressed ball 184" when the valve is open. Of course, a slight pressure will displace the ball, whereby the valve may be shifted. One of the valves of a pair is always in open position, and the valves are operatively connected, so that both valves of a pair are locked against accidental displacement.

In connection with the pressing plunger we have provided an auxiliary valve casing 192 which is preferably bolted to the cylinder 86. Arranged in the valve casing is a rotatable valve 193, having an operating handle 194 attached to the valve stem. Numerals 195 and 196 indicate pipes for alternately admitting and exhausting the fluid pressure through ports 195a and 196a at opposite ends of the cylinder for operating the pressing plunger in the manner hereinbefore described.

With the valve 193 in the position shown in Figure 2, both ports 195a and 196a are open to pipes 195 and 196 so that the pressing cylinder is operated normally, and of course this is the normal position of the valve 193. When, however, it is desired to stop the operation of the cylinder 86, the valve 193 is turned 90° about its axis by the operating handle 194; the pin 194' limiting the extent of movement. By this movement communication between 195, 196, and their respective ports 195a, 196a, is shut off. This movement brings passage 197 in the valve body into communication with port 195a thereby permitting the fluid pressure in the upper end of the cylinder 86 to exhaust to atmosphere through a hole (not shown) provided in the valve casing. At the same time the passage 198 in the valve body is brought into communication with the port 196a. An air line (not shown) with constant pressure leads through the side of the valve casing and communicates with the passage 198 when the valve is in the position now being described, so that constant fluid pressure is admitted to the lower end of the cylinder 86 through port 196a to maintain the piston and plunger in elevated position.

The auxiliary valve described above possesses several desirable functions, such as to maintain the pressing plunger in its upward retracted position independently of the operation of the valves or other machine parts, and to independently operate the pressing plunger while the machine is stationary for the purpose of charging and resetting, or adjusting the molds in alignment with the pressing plunger. It may be mentioned that when the automatic operation of the machine is stopped, pressure is left on pipe 195, so that by movement of the handle 194 the pressing plunger may be raised and lowered as desired, for the various purposes well known to those skilled in the art.

To provide a means for diverting the mold charges when necessary, there is interposed a chute 199 which is adapted to be swung into or out of operative position with respect to the orifice from which the glass flows; the chute being pivoted at 200 to a bracket 201 which is bolted to the column 5.

In the foregoing specification we have described the machine more particularly as for the manufacture of blown ware, but it is to be understood that to employ this machine for the manufacture of pressed ware it is only necessary to strip the machine of the elements which are necessary only in the manufacture of blown ware; that the machine is employed for the manufacture of pressed ware or blown ware; and that the claims are intended to cover the invention when employed for either pressed or blown ware.

The construction of the machine has been described in detail but it will be understood that the particular construction described is subject to many changes and modifications, all of which are intended to be included within the scope of the appended claims.

What we claim is:

1. A glass forming machine, including a rotatable table, blow molds and telescoping blank molds carried by said table, means for raising and lowering the blank molds, into telescoping relation with the blow molds, means for guiding the blank molds, and a loose mounting for the blank molds permitting a freedom movement laterally whereby they automatically align themselves with the blow molds.

2. A glass forming machine, including a rotatable table, blow molds and telescoping blank molds carried by said table, vertically reciprocable members on which the blank molds are mounted, means for guiding the blank molds, and floating connections between the blank molds and said members, whereby the blank molds are free to automatically align with the blow molds.

3. A glass forming machine, including a blow mold and a telescoping blank mold, means for guiding the blank mold, an auxiliary member carrying said blank mold, a vertically sliding member carrying the auxiliary member, and a floating connection between said members.

4. A glass forming machine, including a blow mold and a telescoping blank mold, means for guiding the blank mold, an auxiliary member carrying said blank mold, a vertically sliding member carrying the auxiliary member, and a floating connection between said members, said connection comprising means carried by one of said members and loosely engaging the other of said members.

5. In a glass forming machine, a movable table, a blow mold thereon, a blowhead, associated with the table, and a cylinder for operating the blowhead, said blowhead being pivotally mounted to swing in a vertical plane in the direction of movement of the table, whereby it may be moved laterally for the purpose described.

6. In a glass forming machine, a movable table, a blow mold thereon, a blowhead associated with the table, a cylinder for operating the blowhead, said blowhead being pivotally mounted to swing in a vertical plane in the direction of movement of the table, and releasable means normally maintaining the blowhead in vertical position.

7. In a glass forming machine, a movable table, a blow mold thereon, a blowhead associated with the table, and a cylinder for operating the blowhead, said cylinder being pivotally mounted to swing in a vertical plane in the direction of movement of the table, whereby the blowhead may be moved laterally for the purpose described.

8. In a glass forming machine, a movable table, a blow mold thereon, a blowhead associated with the table, a cylinder for operating the blowhead, said cylinder being pivotally mounted to swing in a vertical plane in the direction of movement of the table, and releasable means normally maintaining the cylinder in vertical position.

9. In a glass forming machine, a blow mold, a blowhead, a cylinder for reciprocating the blowhead, said cylinder being pivotally mounted to swing in a vertical plane, and a latch normally maintaining the blowhead in vertical position, said latch being releasable when pressure is laterally applied to the blowhead.

10. In a glass forming machine, a movable table, a blow mold thereon, a blowhead associated with the table, a cylinder for reciprocating the blowhead, a vertically adjustable bracket, said cylinder being pivotally mounted on said bracket to swing in a vertical plane in the direction of movement of the table, and releasable means normally maintaining said cylinder in vertical position.

11. A glass forming machine, including a base, a rotatable mold table mounted on said base, a Geneva drive wheel for intermittently rotating said table, an auxiliary base upon which the Geneva drive wheel is mounted, and a key-way connection between the base and the auxiliary base, whereby the auxiliary base may be adjusted in a predetermined direction.

12. A glass forming machine, including a rotatable mold table, a Geneva drive wheel for intermittently rotating said table, said Geneva drive wheel being bodily adjustable toward or from the mold table, and a key-way guide for directing the bodily adjustment of the Geneva drive wheel in a predetermined direction.

13. A glass forming machine, including a base, a column carried by said base, a mold table rotatable about said column, a Geneva drive wheel for intermittently rotating said table, an auxiliary base upon which said Geneva drive wheel is mounted, a key-way connection between the base and auxiliary base, said key-way extending radially of said column, and means for adjusting the auxiliary base along said key-way.

14. A glass forming machine, including a rotatable mold table, a Geneva wheel for intermittently rotating said table, and a spring pressed arm movable in a horizontal plane to successively engage the slots of said Geneva wheel to prevent backlash.

15. A glass forming machine, including a rotatable table, a Geneva wheel for intermittently rotating the table, and an arm movable in a horizontal plane to engage the Geneva wheel and prevent backlash, said arm having a tapered end to provide a wedging action.

16. A glass forming machine, including a rotatable mold table, a Geneva wheel for intermittently rotating the table, and a spring pressed arm movable in a horizontal plane to successively engage a wall of the Geneva wheel slots, said arm having a tapered end, whereby a wedging action is produced between the wall and the arm.

ALBERT M. ALGEO.
GEORGE R. HAUB.